US012663575B2

(12) United States Patent
Nakayama et al.

(10) Patent No.: US 12,663,575 B2
(45) Date of Patent: Jun. 23, 2026

(54) EMBLEM

(71) Applicant: KABUSHIKI KAISHA TOKAI-RIKA-DENKI-SEISAKUSHO, Aichi-ken (JP)

(72) Inventors: Daisuke Nakayama, Aichi (JP); Nobuhiro Kudo, Aichi (JP); Tomomi Hattori, Aichi (JP); Suguru Fujisaki, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 0 days.

(21) Appl. No.: 19/199,959

(22) Filed: May 6, 2025

(65) Prior Publication Data

US 2025/0347839 A1     Nov. 13, 2025

(30) Foreign Application Priority Data

May 8, 2024     (JP) ................................. 2024-075856

(51) Int. Cl.
*F21V 8/00*          (2006.01)

(52) U.S. Cl.
CPC ............. *G02B 6/006* (2013.01); *G02B 6/002* (2013.01); *G02B 6/0045* (2013.01); *G02B 6/0055* (2013.01)

(58) Field of Classification Search
CPC ...... B60Q 1/0011; G02B 6/002; G02B 6/006; G02B 6/0015; G02B 6/0045; G02B 6/0055
See application file for complete search history.

(56) References Cited

U.S. PATENT DOCUMENTS

| | | | | |
|---|---|---|---|---|
| 8,705,914 B2 * | 4/2014 | Ghosh | ................... | H10F 77/488 |
| | | | | 359/853 |
| 2019/0001878 A1 * | 1/2019 | Schneider | ............. | G09F 21/049 |

FOREIGN PATENT DOCUMENTS

JP          2012126339 A     7/2012

* cited by examiner

*Primary Examiner* — Keith G. Delahoussaye
(74) *Attorney, Agent, or Firm* — Dority & Manning, PA

(57) ABSTRACT

An emblem includes: a light source; a light guide through which light rays radiated from the light source are guided; and an outer lens that emits light rays by transmitting the light rays radiated from the light guide. The light guide has plural reflective surfaces that reflect the guided light rays from the light source, respectively, toward respective parts of an outer circumferential portion of the outer lens.

7 Claims, 6 Drawing Sheets

EMBLEM

CROSS-REFERENCE TO RELATED APPLICATION

This application is based on and claims priority under 35 USC 119 from Japanese Patent Application No. 2024-075856 filed on May 8, 2024, the disclosure of which is incorporated by reference herein.

BACKGROUND

Technical Field

The present disclosure relates to an emblem.

Related Art

Japanese Patent Application Laid-Open (JP-A) No. 2012-126339 discloses an emblem including a lower cover fixed to a vehicle body, an upper cover layered on an upper surface of the lower cover, an emblem main body layered on an upper surface of the upper cover, and a light source provided between the lower cover and the upper cover. In the emblem described in this literature, the light source emits light rays, thereby enabling an inner circumferential portion and an outer circumferential portion of the emblem to be illuminated and displayed.

Incidentally, when the outer circumferential portion of the emblem is caused to be illuminated by a limited number of light sources, it is conceivable that uneven illuminance will occur at the outer circumferential portion of the emblem (outer lens) in a light emitting state, but the configuration described in JP-A No. 2012-126339 leaves room for improvement in this regard.

SUMMARY

The present disclosure provides an emblem capable of reducing the occurrence of uneven illuminance at an outer circumferential portion of an outer lens in a light emitting state.

An emblem of a first aspect includes: a light source; a light guide through which light rays radiated from the light source are guided; and an outer lens that emits light rays by transmitting the light rays radiated from the light guide. The light guide has plural reflective surfaces that reflect the guided light rays from the light source, respectively, toward respective parts of an outer circumferential portion of the outer lens.

According to an emblem of a second aspect, in the emblem according to the first aspect, between two adjacent reflective surfaces of the light guide, a step is formed having a difference in height in a direction in which each of the light rays from the light source is directed.

According to an emblem of a third aspect, in the emblem according to the first or second aspect, when the outer lens is viewed from a front, a maximum dimension of the outer lens in a left-right direction and a maximum dimension of the outer lens in an up-down direction are set to different dimensions from each other.

According to an emblem of a fourth aspect, in the emblem according to any one of the first to third aspects, the light source is provided at a position different from a centroid of the light guide when the light guide is viewed from a front.

According to an emblem of a fifth aspect, in the emblem according to any one of the first to fourth aspects, each of the reflective surfaces and a direction in which each of the light rays from the light source is directed are orthogonal when the light guide is viewed from a front.

According to an emblem of a sixth aspect, in the emblem according to any one of the first to fifth aspects, the plural reflective surfaces are formed on an outer circumferential surface of an outer circumferential portion of the light guide and are arranged side by side along an outer edge of the light guide.

According to an emblem of a seventh aspect, in the emblem according to any one of the first to sixth aspects, an inner circumferential portion of the light guide has a tapered surface that reflects, toward the plural reflective surfaces, the guided light rays from the light source.

According to the emblem of the first aspect, the light rays radiated from the light source are guided to the light guide. The light rays of the light source guided to the light guide are reflected toward respective parts of the outer circumferential portion of the outer lens via the plural reflective surfaces of the light guide. The light rays reflected from the plural respective reflective surfaces of the light guide are transmitted through respective parts of the outer circumferential portion of the outer lens, so that the outer circumferential portion of the outer lens emits the light rays. As described above, the light rays of the light source guided to the light guide are reflected toward respective parts of the outer circumferential portion of the outer lens via the plural respective surfaces of the light guide, respectively, so that the occurrence of uneven illuminance along the outer circumferential portion of the outer lens can be reduced in a light emitting state.

According to the emblem of the second aspect, reflection of the light rays at a stepped part can be avoided.

According to the emblem of the third aspect, even if the maximum dimension of the outer lens in the left-right direction and the maximum dimension of the outer lens in the up-down direction are set to different dimensions from each other, the occurrence of uneven illuminance along the outer circumferential portion of the outer lens can be reduced in the light emitting state.

According to the emblem of the fourth aspect, even if the light source is provided at a position different from the centroid of the light guide, the occurrence of uneven illuminance along the outer circumferential portion of the outer lens can be reduced in the light emitting state.

According to the emblem of the fifth aspect, the light rays reflected from the respective reflective surfaces travel in parallel toward the outer lens. Consequently, the occurrence of uneven illuminance along the outer circumferential portion of the outer lens can be still further reduced in a light emitting state.

According to the emblem of the sixth aspect, the light rays of the light source guided to the light guide are reflected toward respective parts of the outer circumferential portion of the outer lens via the plural reflective surfaces of the light guide, respectively, so that the occurrence of uneven illuminance along the outer circumferential portion of the outer lens can be reduced in the light emitting state.

According to the emblem of the seventh aspect, even with a configuration in which the light source is disposed on a side of the inner circumferential portion of the outer lens when viewed from the outer lens side, the occurrence of uneven illuminance along the outer circumferential portion of the outer lens can be reduced in the light emitting state.

BRIEF DESCRIPTION OF THE DRAWINGS

An exemplary embodiment of the present disclosure will be described in detail based on the following figures, wherein:

FIG. 6 is a schematic view schematically illustrating a light ray traveling in the light guide.

DETAILED DESCRIPTION

Figure 1:
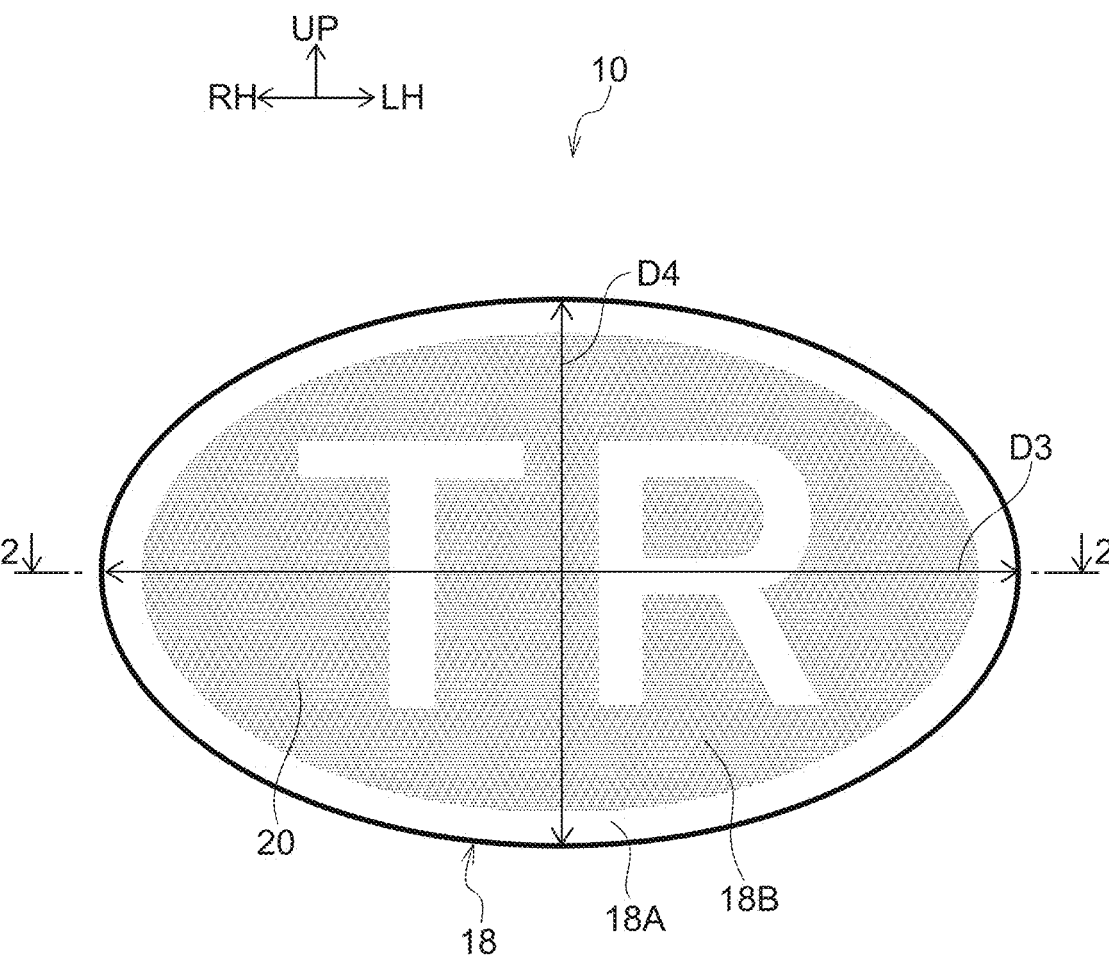
FIG. 1 is a front view illustrating a light emission emblem of an embodiment.

FIG. 1 illustrates a light emission emblem 10 as an emblem of an embodiment. As illustrated in this figure, in the light emission emblem 10 of the embodiment, light rays transmitted through an outer circumferential portion 18A of an outer lens 18 to be described below are emitted to draw an elliptical annular shape, and light rays transmitted through an inner circumferential portion 18B of the outer lens 18 are emitted to draw characters of "TR". An arrow FR and an arrow UP illustrated in figures denote a frontward side and an upward side of the light emission emblem 10, respectively. An arrow RH and an arrow LH illustrated in the figures denote a right side and a left side of the light emission emblem 10, respectively. Hereinafter, in a case where descriptions are simply made using directions of front, rear, up, down, left, and right, the directions indicate front and rear in a front-rear direction of the light emission emblem 10, up and down in an up-down direction of the light emission emblem 10, and left and right in a left-right direction of the light emission emblem 10, respectively, unless otherwise noted.

Figure 2:
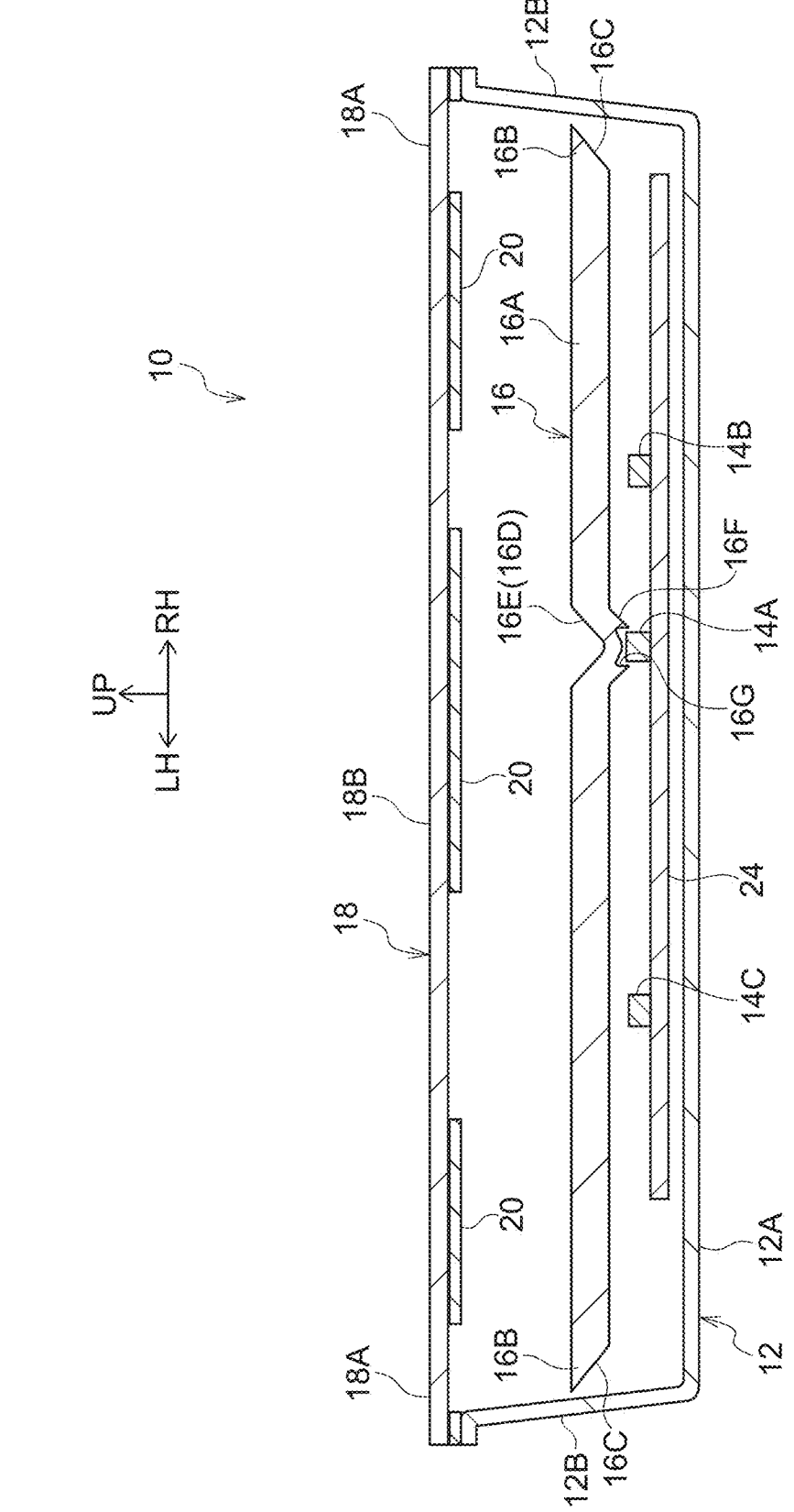
FIG. 2 is a cross-sectional view illustrating the light emission emblem taken along line 2-2 in FIG. 1.

As illustrated in FIGS. 1 and 2, the light emission emblem 10 includes a housing 12, plural light sources 14A, 14B, and 14C provided in the housing 12, a light guide 16 provided in the housing 12, the outer lens 18 attached to the housing 12, and a mask 20 formed on the outer lens 18.

As illustrated in FIG. 2, the housing 12 is formed in a box shape open on a frontward side thereof by using a resin material as an example. The housing 12 includes a bottom wall portion 12A extending in the up-down direction and the left-right direction and having a thickness direction parallel to the front-rear direction and a side wall portion 12B extending toward the frontward side from an outer circumferential end of the bottom wall portion 12A.

The light sources 14A, 14B, and 14C are, for example, LEDs that emit light rays when energized, and are attached to a substrate 24. The light sources 14A, 14B, and 14C are supported by the housing 12 by fixing the substrate 24 to the housing 12. The light sources 14A, 14B, and 14C are disposed on a side of the inner circumferential portion 18B of the outer lens 18 when viewed from the outer lens 18 side. The light source 14A is mainly provided to cause the outer circumferential portion 18A of the outer lens 18 to emit light rays. The light sources 14B and 14C are provided to cause the inner circumferential portion 18B of the outer lens 18 to emit light rays.

Figure 3:
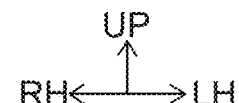
FIG. 3 is a front view of a light guide from a frontward side.
Figure 3:
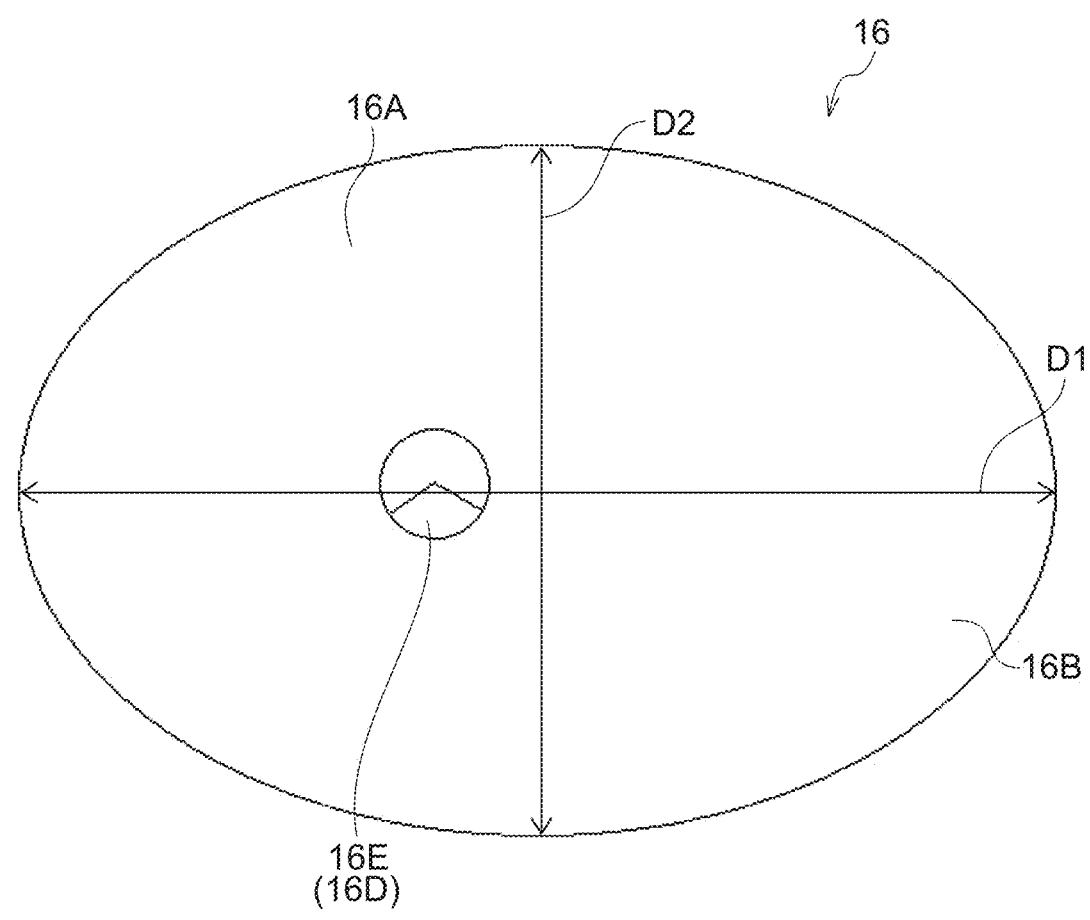

The light guide 16 is formed using a transparent resin material as an example and guides the light rays radiated from the light source 14A. The light guide 16 includes a light guide main body portion 16A formed in a plate shape having a thickness direction parallel to the front-rear direction. An outer edge of the light guide main body portion 16A viewed from the frontward side has an elliptical shape having a longitudinal direction parallel to the left-right direction. Consequently, as illustrated in FIG. 3, when the light guide 16 is viewed from the front, a maximum dimension D1 of the light guide 16 in the left-right direction is larger than a maximum dimension D2 of the light guide 16 in the up-down direction. An outer circumferential surface of an outer circumferential portion 16B of the light guide main body portion 16A has plural reflective surfaces 16C to be described below. As illustrated in FIG. 2, an inner circumferential portion of the light guide main body portion 16A has a tapered recess portion 16D open on the frontward side. An inner circumferential surface of the tapered recess portion 16D is a tapered surface 16E that narrows in a funnel shape from the frontward side toward the rear side. The light guide 16 includes a central projecting portion 16F projecting rearward from a location at which the tapered recess portion 16D is formed in the light guide main body portion 16A. A light source disposing recess portion 16G recessed toward the frontward side is formed in the central projecting portion 16F. The light source 14A is disposed in the light source disposing recess portion 16G. Here, as illustrated in FIGS. 2 and 3, in the light guide 16 of the embodiment, the tapered recess portion 16D and the central projecting portion 16F are provided at a position different from the centroid of the light guide 16 when the light guide 16 is viewed from the front. To be more specific, in the light guide 16 of the embodiment, when the light guide 16 is viewed from the front, the tapered recess portion 16D and the central projecting portion 16F are provided at a position offset to the right side with respect to the centroid of the light guide 16. Consequently, when the light guide 16 is viewed from the front, the light source 14A is disposed at a position offset to the right side with respect to the centroid of the light guide 16.

The light guide 16 described above is supported by the housing 12 on the frontward side from the light sources 14A, 14B, and 14C.

As illustrated in FIGS. 1 and 2, the outer lens 18 is formed using a transparent resin material as an example, and light emission is performed in a range defined by transmitting light rays radiated from the above-described light guide 16. The outer lens 18 is formed in a plate shape having a thickness direction parallel to the front-rear direction. An outer edge of the outer lens 18 when viewed from the frontward side is formed in an elliptical shape corresponding to the light guide main body portion 16A. Consequently, when the outer lens 18 is viewed from the front, a maximum dimension D3 of the outer lens 18 in the left-right direction is larger than a maximum dimension D4 of the outer lens 18 in the up-down direction. An end part of the outer circumferential portion 18A of the outer lens 18 is bonded to a front end of the side wall portion 12B of the housing 12. Consequently, an open end side of the housing 12 is closed by the outer lens 18.

The mask 20 is a light shielding layer provided along a front surface of the outer lens 18 to disable transmission of light from a range different from the defined range in the outer lens 18. The mask 20 is, as an example, a coating film formed along a rear surface of the outer lens 18. The mask 20 may be provided along the front surface of the outer lens 18. In the embodiment, the mask 20 is provided in a range different from parts in the outer lens 18 which emit light rays (the outer circumferential portion 18A of the outer lens 18 and parts of the inner circumferential portion 18B of the outer lens 18 which emit light rays to draw the characters of "TR").

Next, a configuration of the plural reflective surfaces 16C provided at the outer circumferential portion 16B of the light guide main body portion 16A of the light guide 16 will be described.

Figure 4:
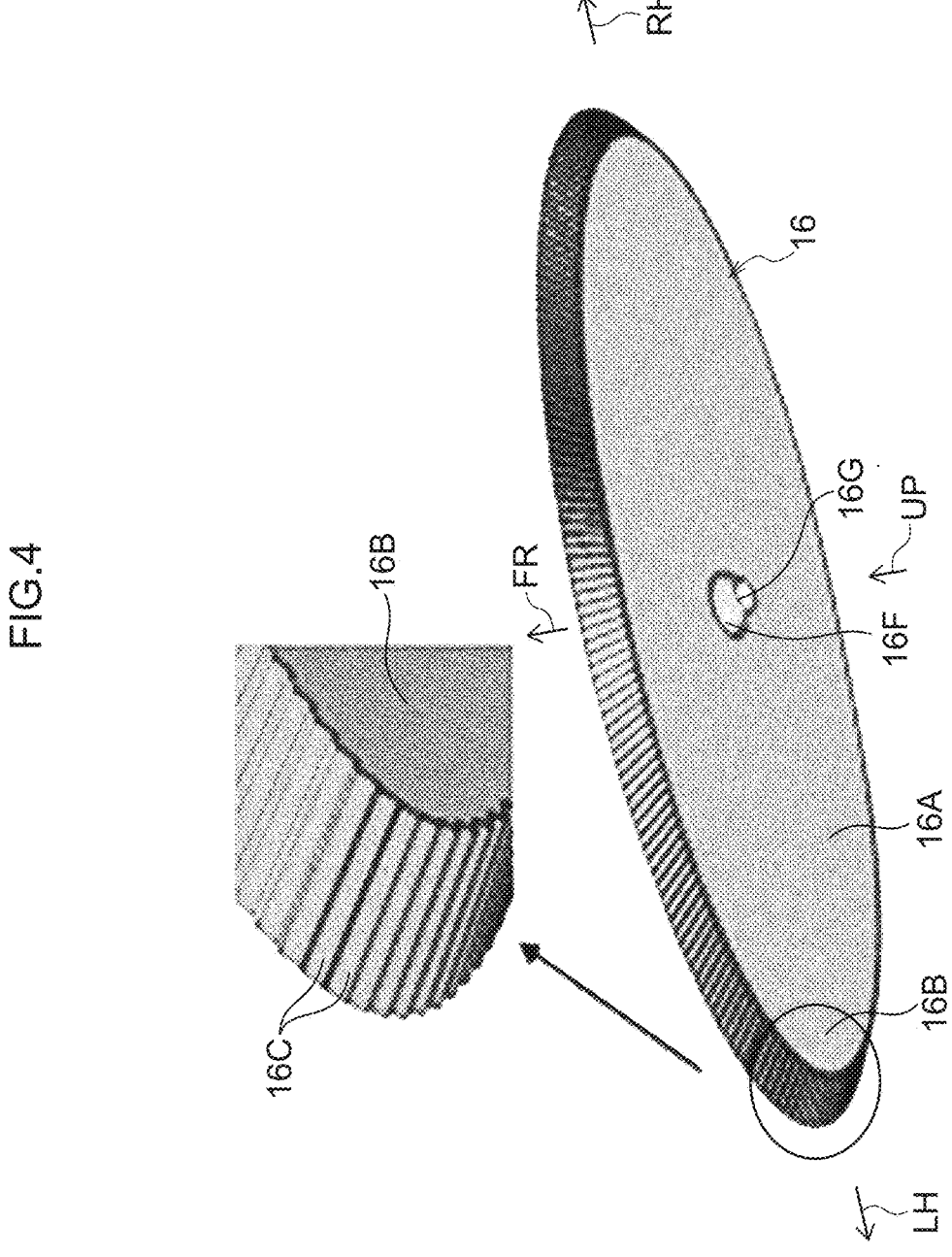
FIG. 4 is a perspective view of the light guide from a rear side.
Figure 5:
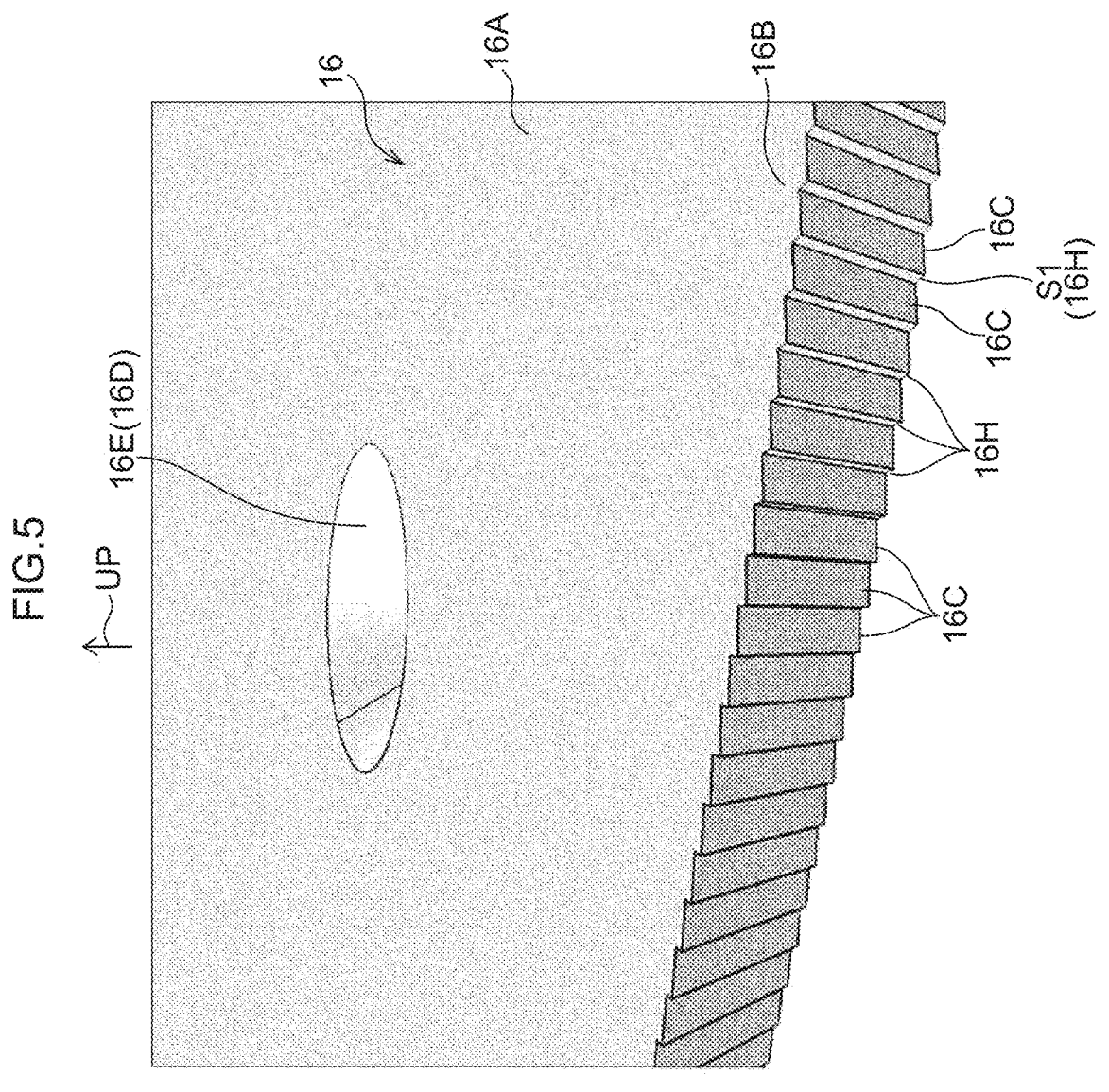
FIG. 5 is an enlarged perspective view illustrating an outer circumferential portion of the light guide in an enlarged manner.

As illustrated in FIGS. 4 and 5, outer circumferential surfaces of the outer circumferential portion 16B of the light guide main body portion 16A include the plural reflective surfaces 16C provided to be inclined toward a side opposite to the center of the light guide main body portion 16A (the centroid when viewed from the frontward side) as the reflective surfaces become parts toward the frontward side. The plural reflective surfaces 16C are arranged side by side along the outer edge of the light guide main body portion 16A. The plural reflective surfaces 16C have a function of reflecting light rays toward respective parts of the outer circumferential portion 18A of the outer lens 18.

Figure 6:
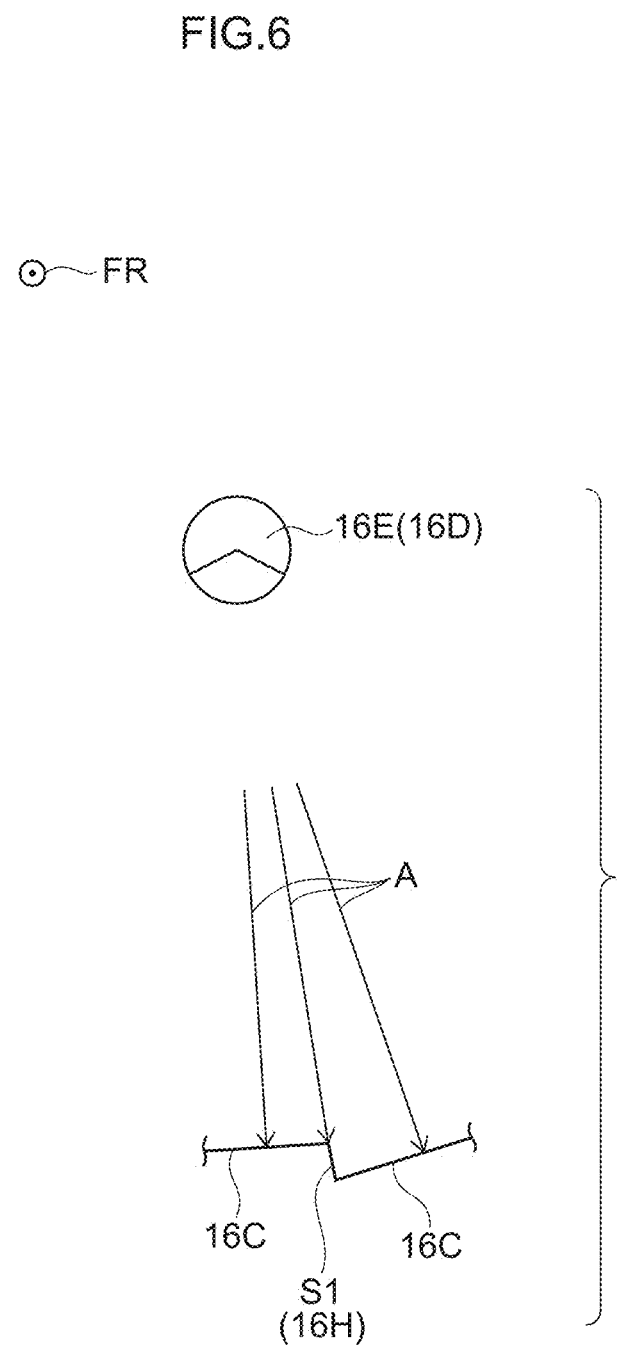

As illustrated in FIGS. 5 and 6, between the two adjacent reflective surfaces 16C in the light guide 16, a step 16H is formed having a difference in height in a direction (direction denoted by an arrow A) in which the light ray radiated from the light source 14A which has reflected from the tapered surface 16E of the tapered recess portion 16D is directed. A flat surface S1 formed by the step 16H is parallel to the direction in which the light ray radiated from the light source 14A and reflected from the tapered surface 16E of the tapered recess portion 16D is directed, whereby the light ray from the light source 14A is not reflected from the flat surface S1. As illustrated in FIG. 6, when the light guide 16 is viewed from the front, each reflective surface 16C and the direction in which the light ray from the light source 14A is directed (the direction denoted by the arrow A) are orthogonal to each other.

Operations and Effects of Embodiment

Next, operations and effects of the embodiment will be described.

As illustrated in FIGS. 1 to 6, in the light emission emblem 10 of the embodiment described above, the light rays radiated from the light sources 14B and 14C are transmitted through the light guide main body portion 16A of the light guide 16 and reach the inner circumferential portion 18B of the outer lens 18. The light rays from the light sources 14B and 14C which have reached the inner circumferential portion 18B of the outer lens 18 are transmitted through respective locations in the inner circumferential portion 18B of the outer lens 18 at which the mask 20 is not formed. Consequently, the inner circumferential portion 18B of the outer lens 18 emits the light rays to draw the character of "TR".

On the other hand, the light rays radiated from the light source 14A are guided from the central projecting portion 16F of the light guide 16 to the light guide main body portion 16A. The light rays of the light source 14A guided to the light guide main body portion 16A are reflected from the tapered surface 16E of the tapered recess portion 16D and reach the plural respective reflective surfaces 16C provided at the outer circumferential portion 16B of the light guide main body portion 16A. The light rays having reached the plural respective reflective surfaces 16C are reflected toward the frontward side and are transmitted through respective parts of the outer circumferential portion 18A of the outer lens 18. Consequently, the outer circumferential portion 18A of the outer lens 18 emits the light rays to draw an elliptical annular shape. As described above, in the light emission emblem 10 of the embodiment, even in the configuration in which the light source 14A is disposed on the side of the inner circumferential portion 18B of the outer lens 18 when viewed from the outer lens 18 side, the light rays from the light source 14A can be guided to the outer circumferential portion 18A of the outer lens 18. In the light emission emblem 10 of the present embodiment, the light rays from the light source 14A guided to the light guide 16 are reflected toward respective parts of the outer circumferential portion 18A of the outer lens 18 via the plural reflective surfaces 16C of the light guide 16, respectively, so that the occurrence of uneven illuminance along the outer circumferential portion 18A of the outer lens 18 can be reduced in a light emitting state.

In the embodiment, between the two adjacent reflective surfaces 16C in the light guide 16, the step 16H is formed having a difference in height in the direction (direction denoted by an arrow A) in which the light ray from the light source 14A which has reflected from the tapered surface 16E of the tapered recess portion 16D is directed. Consequently, reflection of the light ray radiated from the light source 14A at a part (the flat surface S1) of the step 16H can be avoided.

In the embodiment, even if the outer lens 18 viewed from the front has a shape in which the maximum dimension D3 of the outer lens 18 in the left-right direction and the maximum dimension D4 of the outer lens 18 in the up-down direction are set to different dimensions from each other, the plurality of reflective surfaces 16C of the light guide 16 can appropriately reflect the light rays from the light source 14A toward respective parts of the outer circumferential portion 18A of the outer lens 18. Consequently, the occurrence of uneven illuminance along the outer circumferential portion 18A of the outer lens 18 can be reduced in the light emitting state.

In the embodiment, even if the light source 14A is provided at a position different from the centroid of the light guide 16 when the light guide 16 is viewed from the front, the plural reflective surfaces 16C of the light guide 16 can appropriately reflect the light rays from the light source 14A toward respective parts of the outer circumferential portion 18A of the outer lens 18. Consequently, the occurrence of uneven illuminance along the outer circumferential portion 18A of the outer lens 18 can be reduced in the light emitting state.

In the embodiment, when the light guide 16 is viewed from the front, each reflective surface 16C and the direction in which the light ray from the light source 14A is directed (the direction denoted by the arrow A) are orthogonal to each other. In this configuration, the light rays reflected from the respective reflective surfaces 16C travel in parallel toward the outer lens 18. Consequently, the occurrence of uneven illuminance along the outer circumferential portion 18A of the outer lens 18 can be still further reduced in the light emitting state.

In the embodiment, the example has been described in which, when the light guide 16 is viewed from the front, each reflective surface 16C and the direction in which the light ray from the light source 14A is directed (the direction denoted by an arrow A) are orthogonal to each other, but the disclosure is not limited thereto. Whether or not each reflective surface 16C and the direction in which the light ray from the light source 14A is directed are orthogonal to each other when the light guide 16 is viewed from the front may be set, as appropriate, by considering the shape of the outer lens 18, a range in which the light rays are emitted, or the like.

In the embodiment, the example has been described in which, when the light guide 16 is viewed from the front, the light source 14A is provided at the position different from the centroid of the light guide 16, but the disclosure is not limited thereto. For example, a configuration can be employed in which, when the light guide 16 is viewed from the front, the light source 14A is provided at a position overlapping the centroid of the light guide 16.

In the embodiment, the example has been described in which the outer lens 18 viewed from the front has the shape in which the maximum dimension D3 of the outer lens 18 in the left-right direction and the maximum dimension D4 of the outer lens 18 in the up-down direction are set to different dimensions from each other, but the disclosure is not limited thereto. For example, the outer lens 18 viewed from the front may have a horizontally and vertically symmetric shape (for example, a circular shape).

In the embodiment, the example has been described in which, between the two adjacent reflective surfaces 16C in the light guide 16, the step 16H is formed having a difference in height in the direction in which the light ray from the light source 14A which has reflected from the tapered surface 16E of the tapered recess portion 16D is directed, but the disclosure is not limited thereto. For example, a configuration in which the step 16H is not formed can be employed.

Although one embodiment of the disclosure has been described above, the disclosure is not limited to the above description, and it is needless to say that, in addition to the above descriptions, various modifications can be made without departing from the gist of the disclosure.

What is claimed is:

1. An emblem comprising:
a light source;
a light guide through which light rays radiated from the light source are guided; and
an outer lens that emits light rays by transmitting the light rays radiated from the light guide,
wherein the light guide has a plurality of reflective surfaces that reflect the guided light rays from the light source, respectively, toward respective parts of an outer circumferential portion of the outer lens, and
wherein the plurality of reflective surfaces are formed on an outer circumferential surface of the light guide.

2. An emblem comprising:
a light source;
a light guide through which light rays radiated from the light source are guided; and
an outer lens that emits light rays by transmitting the light rays radiated from the light guide,
wherein the light guide has a plurality of reflective surfaces that reflect the guided light rays from the light source, respectively, toward respective parts of an outer circumferential portion of the outer lens, and
wherein, between two adjacent reflective surfaces of the light guide, a step is formed having a difference in height in a direction in which each of the light rays from the light source is directed.

3. The emblem according to claim 1, wherein, when the outer lens is viewed from a front, a maximum dimension of the outer lens in a left-right direction and a maximum dimension of the outer lens in an up-down direction are set to different dimensions from each other.

4. An emblem comprising:
a light source;
a light guide through which light rays radiated from the light source are guided; and
an outer lens that emits light rays by transmitting the light rays radiated from the light guide,
wherein the light guide has a plurality of reflective surfaces that reflect the guided light rays from the light source, respectively, toward respective parts of an outer circumferential portion of the outer lens, and
wherein the light source is provided at a position different from a centroid of the light guide when the light guide is viewed from a front.

5. An emblem comprising:
a light source;
a light guide through which light rays radiated from the light source are guided; and
an outer lens that emits light rays by transmitting the light rays radiated from the light guide,
wherein the light guide has a plurality of reflective surfaces that reflect the guided light rays from the light source, respectively, toward respective parts of an outer circumferential portion of the outer lens, and
wherein each of the reflective surfaces and a direction in which each of the light rays from the light source is directed are orthogonal when the light guide is viewed from a front.

6. The emblem according to claim 1, wherein
the plurality of reflective surfaces are arranged side by side along an outer edge of the light guide.

7. The emblem according to claim 1, wherein
an inner circumferential portion of the light guide has a tapered surface that reflects, toward the plurality of reflective surfaces, the guided light rays from the light source.

* * * * *